United States Patent
Kalra

(10) Patent No.: US 7,779,351 B2
(45) Date of Patent: Aug. 17, 2010

(54) COLORING A GENERATED DOCUMENT BY REPLACING ORIGINAL COLORS OF A SOURCE DOCUMENT PARAGRAPH WITH COLORS TO IDENTIFY THE PARAGRAPH AND WITH COLORS TO MARK COLOR BOUNDRIES

(75) Inventor: Mohit Kalra, Noida (IN)

(73) Assignee: Adobe Systems Incorporated, San Jose, CA (US)

( * ) Notice: Subject to any disclaimer, the term of this patent is extended or adjusted under 35 U.S.C. 154(b) by 1059 days.

(21) Appl. No.: 11/490,650

(22) Filed: Jul. 20, 2006

(65) Prior Publication Data

US 2007/0133072 A1 Jun. 14, 2007

(30) Foreign Application Priority Data

Dec. 9, 2005 (IN) .................. 3316/DEL/2005

(51) Int. Cl.
*G06F 17/24* (2006.01)
(52) U.S. Cl. .................. 715/247; 715/246; 715/275; 715/276
(58) Field of Classification Search ......... 715/210–211, 715/234, 236–239, 247, 249, 275–276, 760
See application file for complete search history.

(56) References Cited

U.S. PATENT DOCUMENTS

| | | | |
|---|---|---|---|
| 4,721,635 A * | 1/1988 | Helinski | 428/15 |
| 5,506,985 A | 4/1996 | Motoyama et al. | |
| 6,298,357 B1 | 10/2001 | Wexler et al. | |
| 6,336,124 B1 | 1/2002 | Alam et al. | |
| 6,381,032 B1 | 4/2002 | Laverty et al. | |
| 6,934,909 B2 | 8/2005 | Tweari | |

(Continued)

OTHER PUBLICATIONS

'Getting Results with Microsoft Ofice 97', Microsoft, 1997. pp. 442-463.

(Continued)

*Primary Examiner*—Cesar B Paula
(74) *Attorney, Agent, or Firm*—Van Pelt, Yi & James LLP

(57) ABSTRACT

A generated document is colored by replacing the original colors of a paragraph of a source document with colors used to identify the paragraph and with colors to mark original color boundaries. The colors used to identify the paragraph and the colors used to mark color boundaries include a pair of colors including a first replacement color and a second replacement color. Values identifying the original colors of the paragraph are stored, including by storing a list of colors corresponding to the original colors of the paragraph. A first character of the paragraph is colored with the first replacement color. A second character of the paragraph is colored with the second replacement color if the original color of the second character is the same as the original color of the first character. The second character of the paragraph is colored with the first replacement color if the original color of the second character is different from the original color of the first character. The colors of the source document are restored to the generated document, including by using the first replacement color as an index into the stored list of colors and coloring a first character of a paragraph of the generated document the indicated color from the stored list of colors.

27 Claims, 4 Drawing Sheets

U.S. PATENT DOCUMENTS

| | | | |
|---|---|---|---|
| 2004/0181746 A1* | 9/2004 | McLure et al. | 715/500 |
| 2005/0015723 A1* | 1/2005 | Light et al. | 715/540 |
| 2005/0240756 A1* | 10/2005 | Mayer | 713/2 |
| 2005/0243345 A1* | 11/2005 | Foehr et al. | 358/1.9 |
| 2005/0273697 A1* | 12/2005 | Weinberg et al. | 715/508 |
| 2007/0008560 A1* | 1/2007 | Eschbach | 358/1.9 |
| 2007/0162840 A1* | 7/2007 | Rochelle et al. | 715/505 |

OTHER PUBLICATIONS

'Office Action in U.S. Appl. No. 11/217,280 mailed Mar. 18, 2009'.
'Office Action in U.S. Appl. No. 11/217,280 mailed Sep. 4, 2009'.

* cited by examiner

COLORING A GENERATED DOCUMENT BY REPLACING ORIGINAL COLORS OF A SOURCE DOCUMENT PARAGRAPH WITH COLORS TO IDENTIFY THE PARAGRAPH AND WITH COLORS TO MARK COLOR BOUNDRIES

FIELD

This application pertains to the field of digital media, and more particularly, to the field of identifying logical elements of a document.

BACKGROUND

It is sometimes desirable to create a document of one format from a document of a different format. For example, one may wish to create a physical markup format document from a semantic markup format file. One example of a semantic markup format is the extensible markup language (XML). Portable document format (PDF) documents are one type of physical markup format files. It may also be desirable to create physical markup format documents from other types of documents, including word processing documents.

One difficulty that may be encountered when creating a document of one format from a document of another format involves identifying logical elements within a source document and reflecting the logical elements in the newly generated document. Examples of such logical elements include character color information, paragraph identification, hyperlinks, etc.

BRIEF DESCRIPTION OF THE DRAWINGS

The claimed subject matter will be understood more fully from the detailed description given below and from the accompanying drawings of embodiments which should not be taken to limit claimed subject matter to the specific embodiments described, but are for explanation and understanding only.

DETAILED DESCRIPTION

Documents may be converted from one format to another in a manner such that only information required to display the document accurately on a screen or printer is maintained. For example, PDF documents are often created by printing from a desktop application like Microsoft Word to a postscript file, and then distilling the resultant postscript file to create a PDF file. This process may lose much or all information about the logical structure of the source document. The newly generated document may have the information required to display it on a screen or printer (so it has information about where on the page to display specific strings of text), but has lost the information of which paragraph these strings were a part of, or the position of that paragraph in the document's structure tree.

Figure 1:
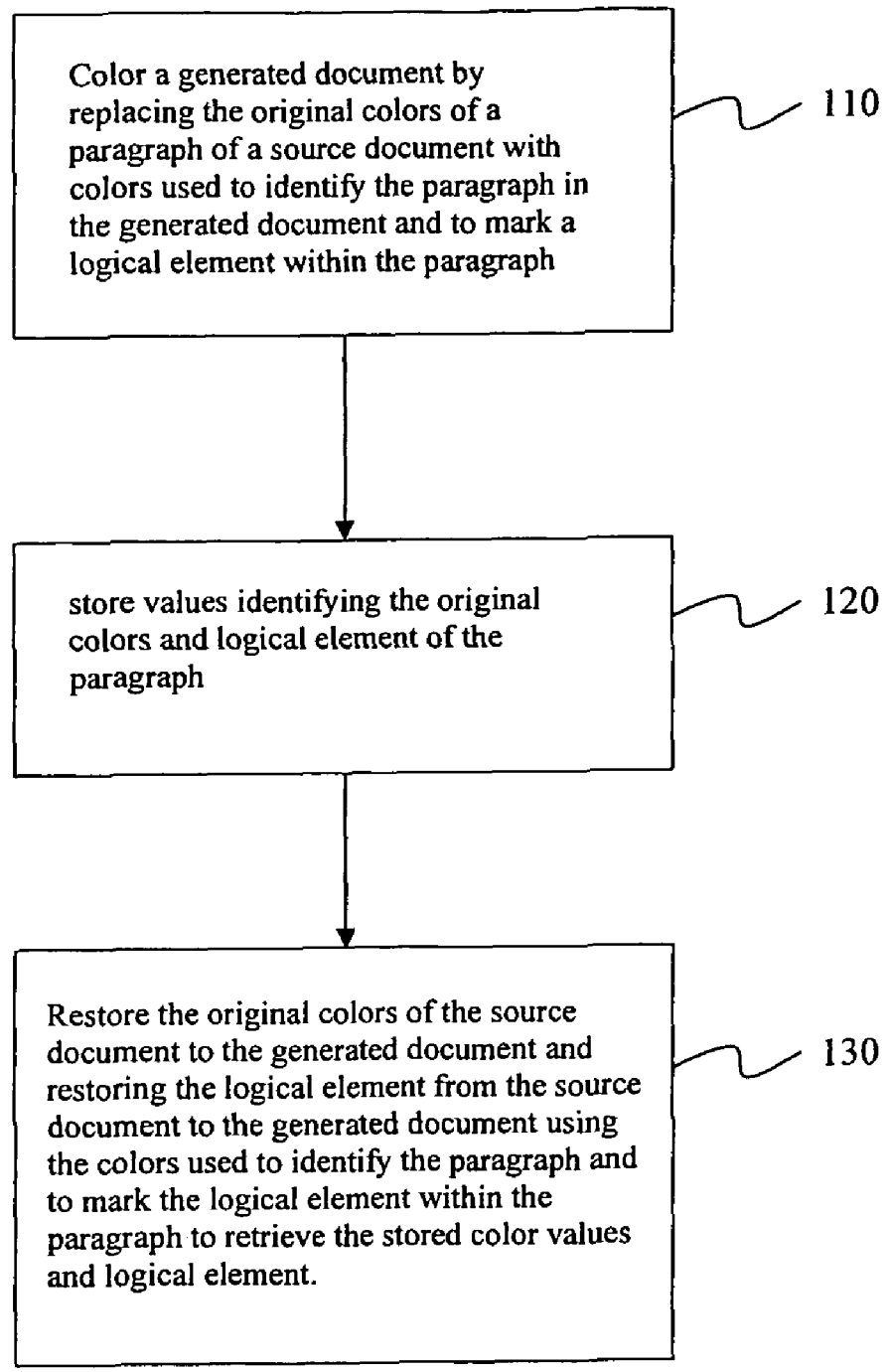
FIG. 1 is a flow diagram of one example embodiment of a method for identifying logical elements of a document.

FIG. 1 is a flow diagram of one example embodiment of a method for identifying logical elements of a document. At block 110, a document generated from a source document is colored by replacing the original colors of a paragraph of the source document with colors used to identify the paragraph in the generated document and to mark a logical element within the paragraph. At block 120, values that identify the original colors and logical element of the paragraph are stored in a data structure. At block 130, the original colors of the source document are restored to the generated document and the logical element from the source document is also restored to the generated document using the colors used to identify the paragraph and to mark the logical element within the paragraph to retrieve the stored color values and the logical element. The method of FIG. 1 may include all, more than all, and/or less than all of blocks 110-130, and furthermore the order of blocks 110-130 is merely an example order, and the scope of the claimed subject matter is not limited in this respect.

Figure 2:
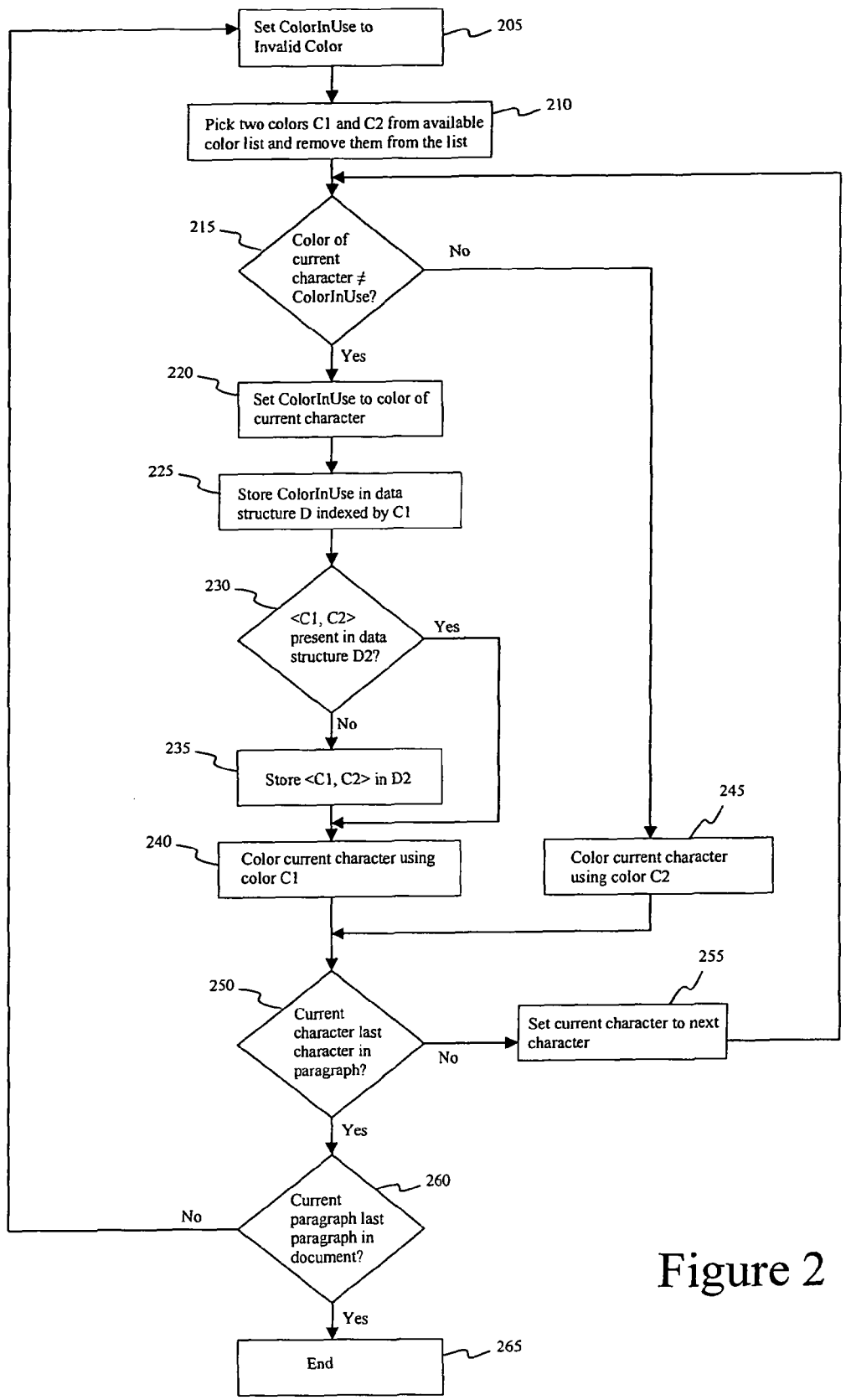
FIG. 2 is a flow diagram of an example embodiment of a method for coloring a document.

FIG. 2 is a flow diagram of an example embodiment of a method for coloring a document. For this example embodiment, a PDF document is generated from a source document. The PDF file is colored in a way such that logical element boundaries are demarcated and also generated in a way that will allow a further process, discussed below, to restore original character colors. For the example embodiment depicted in FIG. 2, a source document is opened. For this example embodiment, the source document may comprise a word processing document. An available color list may be selected. The color list may comprise some or all colors of a color space, for example RGB. A data structure "D" may be allocated. Data structure D may be used to store the original source document colors on a per paragraph basis. An additional data structure D2 may be allocated to store a pair of colors. The example embodiment of FIG. 2 may be iterated over all paragraphs of the source document to create associated paragraphs within the PDF document.

At block 205, a ColorInUse variable may be set to an invalid color (a color that is not part of the color list). At block 210, two colors may be selected from the available color list and the two colors are removed from the list. As a result of removing the two colors from the available color list, the two colors will be unique to the current paragraph. For this example embodiment, the two colors are labeled C1 and C2.

At block 215, a determination is made as to whether the color of the current character of the source document is not the same as the ColorInUse. If the current character matches ColorInUse, at block 245 the current character is colored in the PDF file using the color C2. If the current character does not match ColorInUse, at block 220 ColorInUse is set to the color of the current character of the source document. At block 225 the ColorInUse value is stored in data structure D indexed by C1.

At block 230, a determination is made as to whether the color pair <C1, C2> is present in data structure D2. If <C1, C2> is not present, at block 235 <C1, C2> is stored in D2. At block 240 the current character is colored in the PDF file using color C1.

A determination is made at block 250 as to whether the current character is the last character in the current paragraph. If not, at block 255 the current character is set to the next character and processing returns to block 215. If the determination is made at block 250 that the current character is the last character in the current paragraph, a determination is made at block 260 as to whether the current paragraph is the last paragraph of the source document. If the current paragraph is the last paragraph, the example method ends at block 265. If the current paragraph is not the last paragraph, the process returns to block 205 where another paragraph may be processed. The example method of FIG. 2 may include all, more than all, and/or less than all of blocks 205-265, and furthermore the order of blocks 205-265 is merely an example order, and the scope of the claimed subject matter is not limited in this respect.

In the example algorithm above, each paragraph is colored using only two colors—C1 and C2 (there are no other colors in this paragraph). Whenever within the source document a character's color is different from the previous character's color, it is colored in the PDF file using C1. The original character color is stored in a data-structure D for retrieval during a color restoration process. If the character's color is the same as the previous character's color it is colored using C2. The pair <C1, C2> is unique to one paragraph. The above example algorithm ensures that a paragraph will always be colored using C1 at least once. Therefore, the data-structure D2 helps in obtaining the corresponding C2 for a given C1. This information may be very helpful when restoring the original source document colors because it is important to determine which two colors C1, C2 were used to color a given paragraph. C1 will always be present in the paragraph in the colored PDF document whereas the corresponding C2 can be looked up in the data-structure D2. As can be seen from the discussion above in connection with FIG. 2, the reason why C1 will always be present in each paragraph for this example embodiment is because the first character of every paragraph is colored using C1. This is because for this example embodiment ColorInUse is always initialized to an invalid color for every paragraph. This results in the first character of every paragraph being colored with a C1 that is unique to that paragraph.

Figure 3:
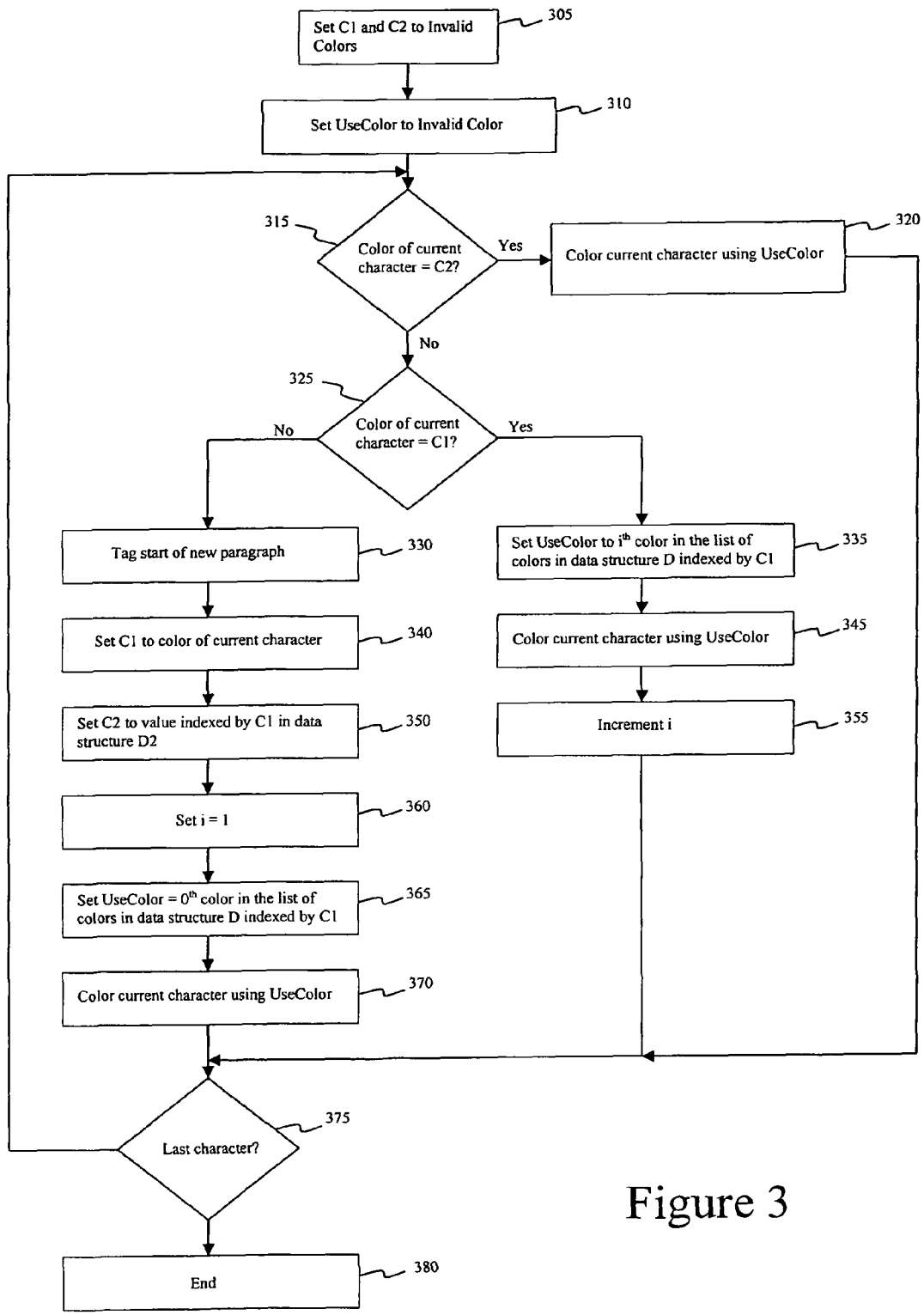
FIG. 3 is a flow diagram of an example embodiment of a method for restoring original source document colors and identifying logical elements.

FIG. 3 is a flow diagram of an example embodiment of a method for restoring original source document colors and identifying logical elements. The example embodiment of FIG. 3 includes tagging the PDF file to identify paragraphs. For this example embodiment, if the colored PDF file is not already opened, it is opened. Data structures D and D2 are obtained so that the information contained in the data structures can be used in the restoration and identification process. The following example algorithm may be iterated over all characters of the colored PDF file.

At block 305, color variable C1 and C2 are set to invalid color values. A UseColor variable is also set to an invalid color value. The UseColor variable represents the color used to color the PDF characters so that they are restored to the original source document colors. A determination is made at block 315 as to whether the color of a current character in the previously colored PDF document matches C2. If the current character has a color that matches C2, at block 320 the current character is colored with the color identified by the UseColor variable. If the color of the current character does not match C2, at block 330 a tag is created in the PDF document identifying the start of a new paragraph.

At block 340, color variable C1 is set to the color of the current character. The example coloring algorithm described above in connection with FIG. 2 ensures that C1 is always present in the paragraph. Color variable C2 is set at block 350 to a value indexed by C1 in data structure D2. At block 360 a variable "i" is set to one. At block 365, UseColor is set to the $0^{th}$ color in the list of colors in data structure D indexed by C1. At block 370, the current character is colored using the color indicated by UseColor.

At block 375, a determination is made as to whether the current character is the last character of the PDF file. If the current character is the last character, the example embodiment ends at block 380. If the current character is not the last character, the process returns to block 315. The example method of FIG. 3 may include all, more than all, and/or less than all of blocks 305-380, and furthermore the order of blocks 305-380 is merely an example order, and the scope of the claimed subject matter is not limited in this respect.

In the above example algorithm, the colored PDF is re-colored in order to restore the source document's original colors. As discussed earlier, during the coloring algorithm, color C1 may be used whenever there is change in the color of two consecutive characters. C2 on the other hand is used when the colors do not change between consecutive characters. To restore the original colors, one task is to determine the pair <C1,C2> for a given paragraph. C1 will always be present in the colored paragraph. Using C1 as a key into the data structure D2, C2 can be determined. Once C1, C2 are obtained, C1 is used to index into D to obtain the list of original colors of the paragraph. In a paragraph, the nth instance of C1 in that paragraph indicates that the nth element in the list-of colors obtained from D is the actual color that should be used to restore the original source document colors in the PDF. In that paragraph, every occurrence of color C2 indicates that the color that was used to color the previous character should be used for the current character as well. Whenever the current character's color does not match with either C1 or C2, it is an indication that a new paragraph has started. New values of C1, C2 and the original color list are obtained for the newly identified paragraph. When a new paragraph is identified, a tag may be created in the PDF.

An additional example will now be discussed. For this example, XML is used to logically represent a source document, a colored document, and relevant data structures. The XML does not necessarily indicate the actual file formats of the source document or of the PDF files. For this example, assume that there are two paragraphs in a source document that have the following text:

AABBBCCCC

XXXXYYYZZ

Let us also assume that the As above are colored Red, Bs are colored Green and Cs are colored Black. Similarly, Xs are colored Blue, Ys are colored Violet, and Zs are colored Cyan. This is an example of how an original source document may be formatted by a user. A simple XML representation of the above example original source document is as follows:

```
<SOURCE-DOCUMENT>
<PARA>
<TEXT color = "RED"> AA </TEXT>
<TEXT color = "GREEN"> BBB </TEXT>
<TEXT color = "BLACK"> CCCC </TEXT>
</PARA>
<PARA>
<TEXT color = "BLUE"> XXXX </TEXT>
<TEXT color = "VIOLET"> YYY </TEXT>
<TEXT color = "CYAN"> ZZ </TEXT>
</PARA>
</SOURCE-DOCUMENT>
```

After this source document is processed by the example coloring algorithm of FIG. 2, a colored document may be obtained. The colored document may be eventually distilled into a colored document, a data structure D that has the original source document colors, and a data structure D2 that may include color pairs <C1,C2>. An example XML representation of the colored document is given below:

```
<COLORED-SOURCE-DOCUMENT>
<PARA>
<TEXT color = "C1__1"> A </TEXT>
<TEXT color = "C2__1"> A </TEXT>
<TEXT color = "C1__1"> B </TEXT>
<TEXT color = "C2__1"> BB </TEXT>
<TEXT color = "C1__1"> C </TEXT>
<TEXT color = "C2__1"> CCC </TEXT>
</PARA>
<PARA>
<TEXT color = "C1__2"> X </TEXT>
<TEXT color = "C2__2"> XXX </TEXT>
<TEXT color = "C1__2"> Y </TEXT>
<TEXT color = "C2__2"> YY </TEXT>
<TEXT color = "C1__2"> Z </TEXT>
<TEXT color = "C2__2"> Z </TEXT>
</PARA>
</COLORED-SOURCE-DOCUMENT>
```

In the example document above, C1__1, C2__1 are the C1, C2 values used for the first paragraph. Likewise, C1__2, C2__2 are the respective C1 and C2 for the second paragraph. Note that C1__1, C2__1 are repeatedly used throughout paragraph 1 and similarly C1__2, C2__2 are only used for paragraph 2. Example data structure D may be represented as follows:

```
<DATA-STRUCTURE-D>
<COLOR-LIST indexed-by = "C1__1">
<COLOR> RED </COLOR>
<COLOR> GREEN </COLOR>
<COLOR> BLACK </COLOR>
</COLOR-LIST>
<COLOR-LIST indexed-by = "C1__2">
<COLOR> BLUE </COLOR>
<COLOR> VIOLET </COLOR>
<COLOR> CYAN </COLOR>
</COLOR-LIST>
</DATA-STRUCTURE-D>
```

The above data-structure is a map that returns the original list of colors for any given C1. With respect to this example, D has stored all six colors used in the document. The first three are indexed by C1__1 as they are used in the first paragraph and similarly C1__2 is used to index the three colors of paragraph 2. The order of the colors in each list may be the order in which they are present in the original source document.

An example XML representation of data structure D2, which in one embodiment may be merged with data structure D, is given below:

```
<DATA-STRUCTURE-D2>
<PAIR>
<FIRST> C1__1 </FIRST>
<SECOND> C2__1 </SECOND>
</PAIR>
<PAIR>
<FIRST> C1__2 </FIRST>
<SECOND> C2__2 </SECOND>
</PAIR>
</DATA-STRUCTURE-D2>
```

As discussed previously, in addition to identifying character colors and paragraphs, other logical elements of documents may be identified in some embodiments. In the XML examples above, pairs of colors are used to mark boundaries within a paragraph where there are changes in color between characters. In some embodiments, other logical elements such as, for example, hyperlinks, character attributes such as bold, underline, color of the underline, italics, etc., may be identified. For example, a simple paragraph with a hyperlink may be represented in XML as follows:

```
<SOURCE-DOCUMENT>
<PARA>
<TEXT color = "RED"> Sample </TEXT>
<TEXT color = "BLACK", Hyperlink = "TRUE"> Hyperlinked </TEXT>
<TEXT color = "BLUE"> Text </TEXT>
</PARA>
</SOURCE-DOCUMENT>
```

For this example, C1 may be used to not only mark boundaries whenever there is change in character color within the paragraphs but also to mark the start and end of a hyperlink. Using embodiments of the example coloring algorithms discussed above, a colored document may be produced as follows:

```
<COLORED-SOURCE-DOCUMENT>
<PARA>
<TEXT color = "C1__1"> S </TEXT>
<TEXT color = "C2__1"> ample </TEXT>
<TEXT color = "C1__1"> H </TEXT>
<TEXT color = "C2__1"> yperlinked </TEXT>
<TEXT color = "C1__1"> T </TEXT>
<TEXT color = "C2__1"> ext </TEXT>
</PARA>
</COLORED-SOURCE-DOCUMENT>
```

An example data structure D may be represented as follows:

```
<DATA-STRUCTURE-D>
<PROPERTY-LIST indexed-by = "C1__1">
<PROPERTY>
<COLOR> RED </COLOR>
</PROPERTY>
<PROPERTY>
<COLOR> BLACK </COLOR>
<HYPERLINK "destination = http://www.adobe.com" > TRUE </HYPERLINK>
</PROPERTY>
<PROPERTY>
<COLOR> BLUE </COLOR>
<HYPERLINK> FALSE </HYPERLINK>
</PROPERTY>
</PROPERTY-LIST>
</DATA-STRUCTURE-D>
```

An example representation of data structure D2 may be as follows:

```
<DATA-STRUCTURE-D2>
<PAIR>
<FIRST> C1__1 </FIRST>
<SECOND> C2__1 </SECOND>
</PAIR>
</DATA-STRUCTURE-D2>
```

Although the above examples describe identifying logical elements within a paragraph, other embodiments are possible that identify logical elements that span more than one paragraph. For example, a hyperlink may stretch from one paragraph to another. The beginning boundary of the hyperlink may be marked in one paragraph the end boundary may be marked in a second paragraph. Further, although the examples discussed above may include converting work processing documents to PDF files, the claimed subject matter is not limited in this respect and other embodiments are possible using any of a wide range of document and/or file types as source documents/files and as generated documents/files.

It is appreciated that throughout this specification discussions utilizing terms such as "processing," "computing," "calculating," "selecting," "forming," "enabling," "inhibiting," "identifying," "initiating," "receiving," "transmitting," "determining" and/or the like refer to the actions and/or processes that may be performed by a computing platform, such as a computer or other electronic device, that manipulates and/or transforms data represented as physical electronic and/or magnetic quantities and/or other physical quantities within the computing platform's processors, memories, registers, and/or other information storage, transmission, reception and/or display devices. Further, processes described herein, with reference to flow diagrams or otherwise, may also be executed and/or controlled, in whole or in part, by such a computing platform.

Figure 4:
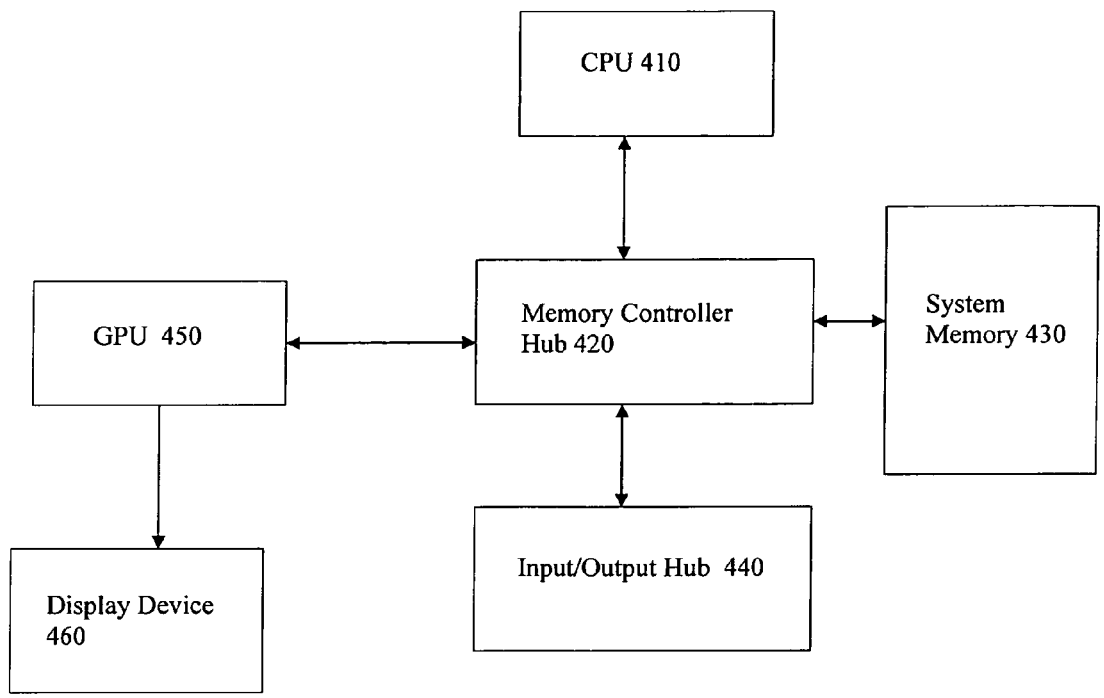
FIG. 4 is a block diagram of an embodiment of an example computer system.

FIG. 4 is a block diagram of an example computer system 400. The term "computer system" as used herein is meant to include any electronic device capable of executing software or firmware instructions. System 400 may be used to perform some or all of the various functions discussed above in connection with FIGS. 1-3. System 400 includes a central processing unit (CPU) 410 and a memory controller hub 420 coupled to central processing unit (CPU) 410. Memory controller hub 420 is further coupled to a system memory 430, to a graphics processing unit (GPU) 450, and to an input/output hub 440. GPU 450 is further coupled to a display device 460, which may comprise a CRT display, a flat panel LCD display, or other type of display device. Although example system 400 is shown with a particular configuration of components, other embodiments are possible using any of a wide range of configurations.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments.

In the foregoing specification claimed subject matter has been described with reference to specific example embodiments thereof. It will, however, be evident that various modifications and/or changes may be made thereto without departing from the broader spirit and/or scope of the subject matter as set forth in the appended claims. The specification and/or drawings are, accordingly, to be regarded in an illustrative rather than in a restrictive sense.

What is claimed is:

1. A method, comprising:

coloring a generated document by replacing the original colors of a paragraph of a source document with colors used to identify the paragraph and with colors to mark original color boundaries, wherein the colors used to identify the paragraph and the colors used to mark color boundaries include a pair of colors including a first replacement color and a second replacement color;

storing values identifying the original colors of the paragraph, including by storing a list of colors corresponding to the original colors of the paragraph;

coloring a first character of the paragraph with the first replacement color;

coloring a second character of the paragraph with the second replacement color if the original color of the second character is the same as the original color of the first character;

coloring the second character of the paragraph with the first replacement color if the original color of the second character is different from the original color of the first character; and using a processor to restore the colors of the source document to the generated document, including by using the first replacement color as an index into the stored list of colors and coloring a first character of a paragraph of the generated document with an indicated color from the stored list of colors.

2. The method of claim 1, wherein restoring the original colors from the source document to the generated document further includes using the colors used to identify the paragraph and using the colors to mark original color boundaries to retrieve the stored color values.

3. The method of claim 2, further comprising creating a tag in the generated document corresponding to the identified paragraph.

4. The method of claim 1, wherein restoring the colors of the source document to the generated document further includes coloring a second character of the paragraph of the generated document the same color as that used to color the first character of the paragraph of the generated document if the second character of the paragraph of the generated document was previously colored with the second replacement color.

5. The method of claim 4, wherein restoring the colors of the source document to the generate document further includes coloring the second character of the paragraph of the generated document with a next color from the stored list of colors if the second character of the paragraph of the generated document was previously colored with the first replacement color.

6. The method of claim 5, further comprising creating a tag corresponding to the paragraph of the generated document.

7. The method of claim 6, further comprising using a second pair of replacement colors to color a second paragraph of the generated document.

8. The method of claim 7, further comprising restoring the colors of the second paragraph of the source document to the generated document using the second pair of replacement colors as indices into the stored list of colors.

9. The method of claim 8, further comprising creating a tag corresponding to the second paragraph of the generated document.

10. A machine-readable medium containing instructions that when executed perform a method, comprising:

coloring a generated document by replacing the original colors of a paragraph of a source document with colors used to identify the paragraph and with colors to mark original color boundaries, wherein the colors used to identify the paragraph and to mark color boundaries include a pair of colors including a first replacement color and a second replacement color;

storing values identifying the original colors of the paragraph, including by storing a list of colors corresponding to the original colors of the paragraph;

coloring a first character of the paragraph with the first replacement color;

coloring a second character of the paragraph with the second replacement color if the original color of the second character is the same as the original color of the first character;

coloring the second character of the paragraph with the first replacement color if the original color of the second character is different from the original color of the first character; and restoring the original colors of the source document to the generated document, including using the first replacement color as an index into the stored list of colors and coloring a first character of a paragraph of the generated document with an indicated color from the stored list of colors.

11. The machine-readable medium of claim 10, wherein restoring the original colors from the source document to the generated document further includes using the colors used to identify the paragraph and the colors to mark original color boundaries to retrieve the stored color values.

12. The machine-readable medium of claim 11, further comprising creating a tag in the generated document corresponding to the identified paragraph.

13. The machine-readable medium of claim 10, wherein restoring the original colors of the source document to the generated document further includes coloring a second character of the paragraph of the generated document the same color as that used to color the first character of the paragraph of the generated document if the second character of the paragraph of the generated document was previously colored with the second replacement color.

14. The machine-readable medium of claim 13, wherein restoring the original colors of the source document to the generated document further includes coloring the second character of the paragraph of the second document with a next color from the stored list of colors if the second character of the paragraph of the generated document was previously colored with the first replacement color.

15. The machine-readable medium of claim 14, further comprising creating a tag corresponding to the paragraph of the generated document.

16. The machine-readable medium of claim 15, further comprising using a second pair of replacement colors to color a second paragraph of the generated document.

17. The machine-readable medium of claim 16, further comprising restoring the original colors of the second paragraph of the source document to the generated document using the second pair of replacement colors as indices into the stored list of colors.

18. The machine-readable medium of claim 17, further comprising creating a tag corresponding to the second paragraph of the generated document.

19. A system, comprising:
a processor configured to:
color a generated document by replacing the original colors of a paragraph of a source document with colors used to identify the paragraph and with colors used to mark original color boundaries, wherein the colors used to identify the paragraph and the colors used to mark color boundaries include a pair of colors including a first replacement color and a second replacement color;

color a first character of the paragraph with the first replacement color;

color a second character of the paragraph with the second replacement color if the original color of the second character is the same as the original color of the first character;

color the second character of the paragraph with the first replacement color if the original color of the second character is different from the original color of the first character; and restore the colors of the source document to the generated document, including by using the first replacement color as an index into the stored list of colors and coloring a first character of a paragraph of the generated document with an indicated color from the stored list of colors; and a memory configured to store values identifying the original colors of the paragraph, including by storing a list of colors corresponding to the original colors of the paragraph.

20. The system of claim 19, wherein the processor is configured to restore the original colors from the source document to the generated document further including by using the colors used to identify the paragraph and using the colors to mark original color boundaries to retrieve the stored color values.

21. The system of claim 20, wherein the processor is further configured to create a tag in the generated document corresponding to the identified paragraph.

22. The system of claim 19, wherein the processor is configured to restore the colors of the source document to the generated document further including by coloring a second character of the paragraph of the generated document the same color as that used to color the first character of the paragraph of the generated document if the second character of the paragraph of the generated document was previously colored with the second replacement color.

23. The system of claim 22, wherein the processor is configured to restore the colors of the source document to the generate document further including by coloring the second character of the paragraph of the generated document with a next color from the stored list of colors if the second character of the paragraph of the generated document was previously colored with the first replacement color.

24. The system of claim 23, wherein the processor is further configured to create a tag corresponding to the paragraph of the generated document.

25. The system of claim 24, wherein the processor is further configured to use a second pair of replacement colors to color a second paragraph of the generated document.

26. The system of claim 25, wherein the processor is further configured to restore the colors of the second paragraph of the source document to the generated document using the second pair of replacement colors as indices into the stored list of colors.

27. The system of claim 26, wherein the processor is further configured to create a tag corresponding to the second paragraph of the generated document.

* * * * *